US011384947B2

(12) United States Patent
Radzinsky et al.

(10) Patent No.: US 11,384,947 B2
(45) Date of Patent: Jul. 12, 2022

(54) SYSTEM FOR ENERGY CONSUMPTION REDUCTION AND COST SAVINGS IN A BUILDING

(71) Applicant: STASIS ENERGY GROUP, LLC, Pomona, CA (US)

(72) Inventors: Jose Radzinsky, Woodland Hills, CA (US); Robert Morton, Modesto, CA (US); Michael Cecchini, Placitas, NM (US)

(73) Assignee: STASIS ENERGY GROUP, LLC, Rancho Cucamonga, CA (US)

( * ) Notice: Subject to any disclaimer, the term of this patent is extended or adjusted under 35 U.S.C. 154(b) by 29 days.

(21) Appl. No.: 17/192,797

(22) Filed: Mar. 4, 2021

(65) Prior Publication Data

US 2021/0318002 A1 Oct. 14, 2021

Related U.S. Application Data

(63) Continuation of application No. 16/827,470, filed on Mar. 23, 2020, now Pat. No. 10,955,154, which is a
(Continued)

(51) Int. Cl.
*F24D 3/16* (2006.01)
*F24F 5/00* (2006.01)
*E04B 9/00* (2006.01)

(52) U.S. Cl.
CPC ............ *F24F 5/0092* (2013.01); *E04B 9/001* (2013.01); *F24F 5/0021* (2013.01); *F24F 2221/14* (2013.01)

(58) Field of Classification Search
CPC .... F24F 5/0092; F24F 5/0021; F24F 2221/14; E04B 9/001
(Continued)

(56) References Cited

U.S. PATENT DOCUMENTS

| 4,572,864 A | * | 2/1986 | Benson | ................... | C09K 5/00 |
| | | | | | 428/116 |
| 4,612,912 A | * | 9/1986 | Lampe | ................... | F28D 20/02 |
| | | | | | 126/669 |

(Continued)

FOREIGN PATENT DOCUMENTS

| DE | 10016211 A1 | 10/2001 |
| EP | 1947411 A1 | 7/2008 |

(Continued)

OTHER PUBLICATIONS

Kosny et al., "PCM-Enhanced Building Envelopes in Current ORNL Research Projects" Advanced Fiber Technologies.
(Continued)

*Primary Examiner* — Claire E Rojohn, III
(74) *Attorney, Agent, or Firm* — Greer, Burns & Crain, Ltd.; Gregory P. Einhorn (57) ABSTRACT

A system for obtaining energy consumptions, savings and cost reduction in structures adapted for human habitation which includes the utilization of a plurality of mats including phase change material encapsulated within first and second layers of plastic material having heat transfer capability disposed within the plenum area above a ceiling of a room within a building with the amount of phase change material contained within each mat being between 0.5 lbs. and 0.67 lbs. per square foot.

16 Claims, 8 Drawing Sheets

Related U.S. Application Data continuation of application No. 15/357,629, filed on Nov. 21, 2016, now Pat. No. 10,634,371.

(60) Provisional application No. 62/257,897, filed on Nov. 20, 2015.

(58) Field of Classification Search
USPC .......................................................... 165/56
See application file for complete search history.

(56) References Cited

U.S. PATENT DOCUMENTS

| | | | | |
|---|---|---|---|---|
| 5,270,550 A * | 12/1993 | Martorana | ............ | F28D 20/023 165/10 |
| 5,626,936 A * | 5/1997 | Alderman | ................ | B32B 3/08 428/323 |
| 5,770,295 A * | 6/1998 | Alderman | .............. | E04B 9/045 428/323 |
| 5,987,834 A * | 11/1999 | Keith | ...................... | F16B 19/00 52/309.7 |
| 5,996,297 A * | 12/1999 | Keith | ........................ | E04C 5/20 52/685 |
| 6,112,491 A | 9/2000 | Keith et al. | | |
| 6,138,981 A * | 10/2000 | Keith | ...................... | E04G 11/18 249/19 |
| 6,263,638 B1 * | 7/2001 | Long, Sr. | .............. | B28B 19/003 52/794.1 |
| 6,615,906 B1 * | 9/2003 | Fieback | ................... | A61F 7/03 165/10 |
| 6,645,598 B2 * | 11/2003 | Alderman | ................ | B32B 3/20 126/618 |
| 7,571,758 B2 * | 8/2009 | Pause | .................... | F28D 20/023 165/47 |
| 7,641,812 B2 * | 1/2010 | Alderman | ................ | E04B 1/78 165/104.19 |
| 7,703,254 B2 * | 4/2010 | Alderman | ............ | E04B 9/0478 52/407.3 |
| 7,704,584 B2 * | 4/2010 | Alderman | ................ | C08K 3/32 165/104.19 |
| 9,016,358 B2 * | 4/2015 | Fieback | ................ | F24F 5/0021 165/10 |
| 9,604,428 B2 * | 3/2017 | Walker | ...................... | B32B 3/18 |
| 2003/0061776 A1 * | 4/2003 | Alderman | .............. | F28D 20/02 52/406.1 |
| 2003/0061777 A1 * | 4/2003 | Alderman | ................ | E04B 1/76 52/406.1 |
| 2008/0017352 A1 * | 1/2008 | Brower | ................ | F24F 5/0021 165/96 |
| 2010/0127000 A1 * | 5/2010 | Horwath | ................ | A62C 2/065 220/592.01 |
| 2012/0048768 A1 * | 3/2012 | Holloway | .............. | C09K 5/063 206/524.1 |
| 2015/0056404 A1 * | 2/2015 | Sawafta | .................. | E04C 2/205 428/188 |
| 2015/0204618 A1 * | 7/2015 | Owens | .................. | F28D 20/026 165/10 |
| 2017/0013789 A1 * | 1/2017 | Bose | ...................... | A01G 9/243 |
| 2017/0146251 A1 * | 5/2017 | Radzinsky | ............ | F24F 5/0092 |
| 2018/0355606 A1 * | 12/2018 | Alderman | ................. | E04B 1/78 |
| 2019/0106878 A1 * | 4/2019 | Alderman | ............. | E04B 1/7654 |

FOREIGN PATENT DOCUMENTS

| | | |
|---|---|---|
| FR | 2268130 A1 | 11/1975 |
| WO | 2007082559 A1 | 7/2007 |
| WO | 2010092393 A1 | 8/2010 |
| WO | 2013103596 A1 | 7/2013 |

OTHER PUBLICATIONS

Childs et al., "Potential Energy Savings Due to Phase Change Material in a Building Wall Assembly: An Examination of Two Climates" Oak Ridge National Laboratory, Mar. 2012.

Al-Saadi et al., "Modeling phase change materials embedded in building enclosure: A review" Renewable and Sustainable Energy Reviews, 2013, v 21, p. 659-673.

Campbell et al., "Phase Change Materials as Thermal Storage for High Performance Homes" Proceedings of the ASME 2011 International Mechanical Engineering Congress & Exposition, Nov. 11-17, Denver, Colorado, USA.

Al-Hadithi "Use of Phase Change Material in Residential Walls to Reduce Cooling Load" Anbar Journal for Engineering Sciences, 2011, v 4, n 1, p. 72-86.

Childs et al., "Use of Phase Change Material in a Building Wall Assembly: A Case Study of Technical Potential in Two Climates" International High Performance Buildings Conference at Purdue, Jul. 16-19, 2012, p. 1-10.

Yarbrough et al., "Use of PCM-Enhanced Insulations in the Building Envelope" Journal of Building Enclosure Design, 2009, p. 55-59.

Kosny et al., "2006/07 Field Testing of Cellulose Fiber Insulation Enhanced with Phase Change Material" Sep. 2008.

Muruganantham "Application of Phase Change Material in Buildings: Field Data vs. EnergyPlus Simulation" Dec. 2010.

Konstantinidou "Integration of thermal energy storage in buildings" Master Thesis—Spring 2010.

Kosny et al., "Short History of PCM Applications in Building Envelopes" Engineering Materials and Processes, 2015, p. 21-59.

Moheisen et al., "Utilization of Phase Change Materials (PCM) to Reduce Energy Consumption in Buildings" Applied Research Associates, Sep. 2011.

"Phase Change Materials for Building Cooling Applications" Design & Engineering Services Customer Service Organization Southern California Edison, Dec. 2012.

* cited by examiner

FIG. 8B

SYSTEM FOR ENERGY CONSUMPTION REDUCTION AND COST SAVINGS IN A BUILDING

RELATED APPLICATIONS

This United States utility patent application is a continuation of U.S. utility patent application Ser. No. 16/827,470, filed Mar. 23, 2020 which is a continuation of U.S. utility patent application Ser. No. 15/357,629, filed Nov. 21, 2016, now U.S. Pat. No. 10,634,371, issued Apr. 28, 2020, which claims benefit of priority to U.S. Provisional Patent Application Ser. No. 62/257,897, filed Nov. 20, 2015. The aforementioned applications are expressly incorporated herein by reference in their entirety and for all purposes.

FIELD OF THE INVENTION

This invention relates generally to the utilization of phase change materials in buildings to reduce energy consumption and lower energy costs for the cooling and heating of the buildings and more particularly to such a system utilizing bio-based phase change materials encapsulated in plastic layers having heat transfer capabilities.

BACKGROUND OF THE INVENTION

The utilization of phase change materials within a building to enhance the thermal performance of a building is well known. Phase change material is a highly productive thermal storage medium which can be utilized through the change of its physical state within a certain temperature range to mitigate the amount of energy consumed in maintaining the temperature of a building structure. When the temperature of the phase change material is obtained which causes it to transition from a solid to a liquid state, the phase change material absorbs and stores a large amount of latent heat. When the temperature of the phase change material then passes so that the material goes from a liquid to a solid state, the stored latent heat is released into the environment. The thermal effects which are obtained by utilizing a phase change material within a building structure is a cooling effect caused by the latent heat absorption of the phase change material, a heating effect caused by the latent heat release of the phase change material. This provides a regulating effect of the temperature within the building from either latent heat absorption or latent heat release of the phase change material.

It is, therefore, desirable to provide a phase change material of a specific type and constructed in a specific manner which enhances the reduction of the energy consumption within a building adapted for human habitation.

SUMMARY OF THE INVENTION

A system for energy consumption savings and cost reduction in structures adapted for human habitation which includes a building having a room including a ceiling and having a plenum area above the ceiling, a first mat including a phase change material encapsulated within layers of plastic material having heat transfer capability disposed in the plenum area, a second mat including phase change material encapsulated within layers of plastic material also having heat transfer capability disposed within the plenum area but spaced from the first mat. The amount of phase change material contained within each mat being between 0.15 lbs. and 1.0 lbs. per square foot and the solid to liquid transition point for said phase change material is from 72° F. to 76° F. and the liquid to solid transition point for said phase change material is from 71° F. to 68° F.

DETAILED DESCRIPTION OF THE PREFERRED EMBODIMENTS

The inventors have developed organic and inorganic phase change material (PCM) applications which are engineered to significantly reduce energy consumption and lower energy costs for the cooling and heating of residential and non-residential buildings. While PCMs have been used and tested as thermal mass components in buildings for at least 40 years, the engineering and adoption of PCMs into the marketplace has been hampered by lack of valid and accurate engineered solutions to support effective designs and installations of high performance PCM assemblies. The challenge has been to develop PCM assemblies that accomplish significant energy and cost savings while at the same time meeting reasonable economic models for an acceptable Return on Investment (ROI) and First Cost. Numerous studies show that PCMs can reduce energy consumption by reducing and shifting peak energy use loads yet there is little market penetration due to poor performance and long ROI's for existing PCM products. This is largely due to the lack of engineering, technical development and performance optimization of the PCM product assemblies themselves.

The inventors have developed practical and economical PCM applications for new and existing buildings comprised of various phase change materials (PCM) called StasisPCM, which are assemblies consisting of bulk PCMs, various containment options for packaging, and various engineering and installation methods which, when combined or used individually, cause the PCM assemblies to store energy (heat) by undergoing a solid-to-liquid phase transition, the melting point, and release energy by undergoing a liquid-to-solid phase change, the freezing point, at specific, engineered temperatures. StasisPCM utilizes optimized engineering of the bulk PCM combined with enhanced packaging and installation to create PCM assemblies which yield significantly greater energy savings and shorter ROI than any other PCM product available in the marketplace. StasisPCM can be installed in new or existing residential or commercial buildings in the space above ceilings or ceiling tiles and between floors in multi-story buildings or below the roof in single story buildings or in conjunction with metal roofs like the standing seams roof. StasisPCM mitigates and manages the thermal energy in these areas, whether caused separately or in combination by internally generated (occupant, lights and equipment) loads, or by external loads (caused by solar gain from the sun and thermal gain due to the ambient, outside air temperature.) StasisPCM assemblies can be installed in one or more layers, over complete building areas or part of the building areas, and are part of an engineered solution designed to reduce energy consumption due to heating and cooling and to reduce costs and create energy savings.

Bulk PCMs are readily available both domestically and internationally and generally are separated into three major categories, differentiated by their active materials: organic, inorganic and bio-based.

Organic PCMs are petroleum based and most commonly derived from paraffinic compounds. They are chemically stable and melt congruently, however they are flammable, can generate harmful fumes on combustion, have generally lower latent heat capacities and usually are microencapsulated with compounds such as acrylic to decrease flammability but this process often insulates the PCM and decreases effectiveness of the product.

Inorganic PCMs are salt hydrates or eutectic salts or similar compounds which typically have a high latent heat capacity, generally non-flammable and relatively inexpensive but can be highly corrosive and exhibit a high level of instability, erratic re-solidification and suffer from cycle degradation which shortens life cycle and yields poor performance.

Bio-based PCMs are the newest type of PCMs and have evolved due to the above mentioned disadvantages of the Organic and Inorganic compositions. They are primarily naturally occurring fatty acid compounds, such as natural palm, date and coconut oils, but can also be beef tallow and certain types of algae. They possess high latent storage capacities, show no performance degradation due to cycling and their flammability and combustibility levels are suitable for construction products and with proper containment or packaging pass flame and fire test standards required for commercial grade building materials.

There are also a few hybrid PCM compounds available which are generally derived by mixing two or more PCMs together but these are generally marginal products that have not been scientifically developed or supported by technical research.

The inventors use bio-based PCM as the primary type of bulk PCM for their assemblies. High latent heat capacities, stable compounds, low flammability, extended life cycle and no degradation of performance over time are critical to developing a long lasting and high performance product. Through rigorous experimentation and testing of our PCM assemblies, the inventors have determined the variables affecting the performance of PCMs installed in a building space, and which must be considered when engineering a PCM solution:

The building and the HVAC system must be analyzed, and variables such as internal loads (from occupants, lighting and equipment), external loads (from solar heat gain and ambient air affects), schedule of occupancy, systems controls, Building Automation Systems, plenum air velocities and temperatures, thermostat set points, geographic location, physical orientation of building, type of building construction, building thermal resistance, amount of glass in combination with the amount and type of envelope building materials covering the building exterior, must be identified and evaluated in order to design a high performance engineered PCM solution.

The PCM must be optimized for latent heat storage capacity over specific melting and freezing temperature ranges that are necessary for optimized PCM performance for specific building temperatures, territories and operational profiles. The bulk PCM assemblies and specific melting and freezing properties may also be optimized for specific climate zones.

The actual amount of bulk PCM selected for an installation is determined by the needs of the client and building owner. In some cases the ROI drives product selection and in others the amount of energy reduction is the determining factor.

The amount of bulk PCM installed per square foot of packaging can vary from 0.15 lb/sf up to 1.0 lb/sf, depending upon design requirements. The amount per SF of bulk PCM is optimized by determining the total thermal load affecting the specific building installation, whether internal, external or comprised of both, measured in BTU/SF/HR, and analyzing the total loads as they occur over a 24 hour period, paying particular attention to the hours of building occupancy and use, using proprietary PCM design software. Once the specific magnitude and occurrence of the thermal load targeted for mitigation is identified, then the appropriate bulk PCM formulation is selected to provide the best performance based upon the unique temperature profile of the bulk PCM, so that the melting and freezing ranges of the PCM selected occurs within the normal temperatures encountered within the building assembly. Once the specific bulk PCM formulation is selected, then the joules/gram of latent heat capacity is known (as each temperature formulation has a different j/g latent heat value) and the amount of material used per square foot is determined by using enough bulk PCM per square foot to counteract the amount of total thermal load targeted for mitigation. This process yields a PCM assembly that is specifically engineered for volume, weight, latent heat capacity and temperature profile to offset the thermal loads by capturing a specific amount of BTUs over a specific time period.

For example, for an internal zone of a multi-story office building in any climate zone, where the PCM assembly is installed in the space between the top of ceiling or ceiling tile and the bottom of the floor above (the plenum area), and the space is subject to a thermal load due to lights, equipment and occupants, of 8 BTU/SF/HR and the space is occupied for 11 hours per day, then the total load over the 11 hours is 88 BTU/SF of thermal energy introduced into the space. Using a bulk PCM that has been selected for the appropriate temperature melt and freeze ranges (in this example, a melt range from 76° to 72° F. and a freeze range from 71° to 68° F., with a latent heat value of 192 j/g), a PCM assembly containing 0.5lb to 0.67 lb/SF may be selected. The melting temperature range of the bulk PCM is selected due to the fact that this range of melting temperatures corresponds very closely to the occupied space temps controlled by the HVAC system and thermostat set points, and the freezing temp range is selected because it is lower temperature than the melting range and also can be easily reached by typical HVAC cooling systems or by using "free" economizer cooling if cool nighttime temperatures below 68° F. are common for the specific climate zone. In this example, the 0.5 lb/SF package has 42 total BTU/SF of latent heat storage capacity and the 0.67 lb/SF has 55 BTU/SF. Depending upon the actual cost per KWh of electricity charged by the utility company, and whether or not peak pricing energy rates in effect, the PCM assembly yielding the most advantageous energy savings is selected and placed directly on top of the ceiling or ceiling tile in the interior offices. (It should be noted that if even greater energy savings is desired, then more than one layer of PCM assembly may be installed using the techniques and methods described below to suspend more than one layer of PCT).

For an external zone of a multi-story office building in the Los Angeles climate zone (specifically Burbank, Calif.), where the PCM assembly is installed in the space between the top of ceiling or ceiling tile and the bottom of the floor above, in the South and West perimeter rooms (adjacent to the building exterior), and the space is subject to an internal thermal load due to lights, equipment and occupants, of 88 BTU/SF/over the occupied hours, and a combined external solar gain and ambient thermal load gain over the same period of 180 BTU/SF, then the total thermal load is 268 BTU/SF, however this load is not uniform and increases in magnitude over the 11 hour period of occupied use. Using a bulk PCM that has been selected for the appropriate temperature melt and freeze ranges (in this example, a melt range from 76° to 72° F. and a freeze range from 71° to 68° F. which has a latent heat value of 192 j/g), PCM assemblies containing 0.5lb to 0.67 lb/SF may be selected. In this example, the 0.5 lb/SF package has 42 total BTU/SF of latent heat storage capacity and the 0.67 lb/SF has 55 BTU/SF. In this example for Burbank, Calif., the utility company offers peak and off peak pricing for energy, so the strategy is to "shift" as much of the energy use to off-peak, nighttime hours. In this example, this can best be accomplished by installing the PCM assemblies in combination to yield the most advantageous energy savings. A PCM package containing 0.5lb/SF of bulk PCM is installed directly on top of the ceiling or ceiling tile and one or more 0.67lb/SF PCM packages are installed elevated in the space above the first PCM package, using techniques and methods described below. Elevated PCM packages are installed at varying heights, varying from 4" to 12" above the first package. One 0.67 lb/SF PCM package is installed above the first package if the shortest ROI is desired, and two or more packages are installed if the client desires the maximum energy savings over shortest ROI.

This same building, for the North and East facing exterior zone perimeter offices, the total magnitude of combined thermal load is less than for West and South facing offices. In this example, the total internal load is 88 BTU/SF and the total external load is 100 BTU/SF for a total load of 188 BTU/SF, which increases in magnitude over the period of occupancy. In this example for Burbank, Calif., the best performing PCM assembly ROI is to install 0.67 LB/sf of bulk PCM directly on top of the ceiling or ceiling tile, in the same temp and latent heat capacities described above, or can be modified to include an elevated package of bulk PCM is maximum energy savings is desired.

Using the strategies for engineering and savings described above to design and install PCM assemblies, this example of a Burbank, Calif. multi-story building can yield energy consumption savings related to cooling from 25-45% and cost reductions from 40-55% related to cooling, annually, dependent upon the final result desired by the client.

Similar engineering solutions can be applied for other buildings in other climate zones throughout the country, where all of the unique factors affecting energy usage are determined and then the most appropriate and highest performing PCM assembly is deployed.

The PCM assemblies may also be optimized to completely or partially capture and shift daytime energy use load to low-use or low-demand, off peak hours, as established by the utility company or power providers.

The packaging or assembly of the bulk PCM must also be engineered to optimize the performance of PCM, specifically related to maintaining high surface area to volume ratios and overall size and shape of the PCM packaging, as these factors dramatically affect PCM performance.

The physical properties and composition of the packaging material are also designed and selected based upon the specific thermodynamic conditions and heat transfer mechanisms governing the specific installation and intended use, whether the heat transfer is conductive, convective or radiant.

The overall size of PCM assemblies are manufactured as follow: 1 ft×2 ft, 1 ft×4 ft, 2 ft×2 ft, 2 ft×4 ft. These sizes are the most suitable for installation above ceiling or ceiling tiles and generally mirror the overall dimensions of commercial ceiling tiles. For some applications, particularly when the assemblies are installed vertically, as in a wall cavity, the overall length of the PCM assemblies are manufactured in lengths as required for ease of installation.

In some cases the PCM is optimized to incorporate "free economizer cooling", provided by cool, nighttime ambient, outside air, available in some climate zones during certain parts of the year, where it is possible to use "free", outside ambient air to freeze the PCM assemblies during the night time in lieu of mechanically conditioned air.

For the interior zone of multi-story commercial office buildings, (central core space which is buffered by offices exposed to the building exterior and typically not affected by external thermal loads), the ideal bulk PCM melting point range is from 72 to 76° F. and the freezing point range is from 71 to 68° F.

For the exterior zones of all buildings, the ideal bulk PCM melting and freezing point ranges may vary and are determined by performing an engineering analysis of the building variables and climate zone in order to optimize PCM assembly performance.

For multi-story commercial office buildings, in certain territories, the use of "free" economizer cooling can be utilized and combined with various PCM assemblies to yield dramatic reductions in energy consumption and energy cost.

In some cases the StasisPCM is placed directly on top of the ceiling or installed above the ceiling tile and the packaging is selected for optimized heat transfer determined by the location and method of installation.

In all cases, the packaging material selected for the top and bottom faces of the PCM assembly are multi-layer films with unique compositions, where the top film and the bottom film are sealed using heat and in some cases adhesives, that are engineered for the specific PCM installation.

For most of our PCM assemblies, we use a multi-layer film composed of individual layers, bonded together, of Nylon, Adhesive, Polyethylene Tie EVOH barrier and Tie Polyethylene sealant for exposed surfaces of packaging and add titanium dioxide to the side bearing on the ceiling tile or ceiling. Aluminum may also be added to one or both faces of packaging for assemblies required to meet fire test standards.

If the PCM package is in physical contact with the ceiling or ceiling tile below, the contact surface may be selected to optimize conductive heat transfer, and the exposed surface of the package may be optimized for convective air transfer, induced by air circulating within the plenum area above the ceiling or tile.

In some cases, the top and bottom (exterior faces) of the PCM assembly may be designed to retard convective and or conductive heat transfer.

In some cases, the top and bottom of the PCM assembly may be designed using reflective or radiative facings.

In some cases, more than one layer or level of PCM assemblies are installed and separated from adjacent assemblies, either vertically or horizontally, by providing space between individual layers or levels by utilizing the a grid to install more than one PCM package or assembly and can increase the convective heat transfer between layers or levels of PCM and increases the total latent heat storage capacity of the PCM installation.

Individual levels or layers of PCM may be the same temperature profile or may be of different temperature profiles, may be of same or different packaging, depending on the engineering of the application.

The ability to install more than one PCM assembly in the vertical space above a ceiling tile or ceiling is key to optimizing and increasing StasisPCM performance, whether the multiples of PCM assemblies are manufactured or field assembled, whether they are of the same packaging or different, on one or both faces, whether the PCM is installed as separate elements or as part of a single or multi-part assembly, whether the bulk PCM in any given package is of identical formulation or whether they are different formulations for temperature, latent heat storage potential and or melt and freeze ranges.

The method of installing one or more PCM assemblies may be accomplished by supporting the PCM directly on top of the ceiling or ceiling tile or by utilizing the ceiling tile grid work for support or by suspension from the framing members above the ceiling or ceiling tile, by use of racks, trays or cassettes wherein more than one mat or package is installed either horizontally or vertically separated from the adjacent package, either beside or below.

Multiple PCM assemblies, racks, trays, called the StasisGRID system, or other multiple package assemblies may also be supported by wires, structural elements attached to building sub framing located above the ceiling or ceiling tile, or may be suspended by wires, mesh or grids hung vertically or horizontally throughout the space above the ceiling or ceiling tile.

In some cases, the plurality of mats, assemblies or packages may be installed attached to or adjacent to the underside of framing above the ceiling or ceiling tile, whether the framing is a subfloor or underside of roof construction element.

By using individually or by combining one or more of the methods above, additional latent heat storage capacity can be increased to significantly reduce energy consumption, shift the energy demand load to off-peak usage, and reduce the cost of energy used for heating and cooling.

Use of PCM assemblies also results in increased life expectancies of HVAC units and reduced maintenance costs of the equipment.

Other PCM assemblies which reduce energy consumption and energy costs include:
  Combining the PCM assemblies with metal ceiling tiles or panels which can also be perforated, by replacing or installing the metal in lieu of ceiling tiles.
  Combining the PCM assemblies with "egg crate" ceiling tiles or lighting panels, whether made of plastic, metal, PVC, foam or wood, by replacing or installing the "egg cate" in lieu of ceiling tiles.
  Combining PCM assemblies with one or more layers of building insulation, whether on one or both sides, to manage and affect the flow of thermal energy through the PCM by inhibiting the release of thermal energy from one side of the assembly.
  Combining the bulk PCM with metal or composite additives to enhance thermal conductivity and heat transfer within the PCM assembly.
  Combining the bulk PCM with metal or composite inserts, located within the packaging and surrounded by bulk PCM, which increase thermal conductivity and heat transfer throughout the PCM assembly.
  Combining the PCM assemblies with metal roof or wall panels for new and retrofit applications, where building insulation is installed between metal panels and PCM assemblies to increase thermal resistance or R-value of the overall assembly.

One of the additional challenges faced by PCM product companies to successfully introduce their PCM products to the marketplace has been the lack of accurate, validated design and engineering software suitable to creating an optimized and high performance PCM design for new or existing residential or commercial buildings. Current software products do not accurately predict the performance of PCM assemblies for many different reasons. The inventors have developed engineering, design, estimating and optimization software for PCMs in numerous construction applications, including new designs and retrofit applications for existing building.

The software developed by the inventors incorporates numerous proprietary algorithms which have been developed as a result of rigorous testing and experimentation of their PCM assemblies in lab, small scale and full scale test installations. The software may be used for existing (retrofit) applications, for new construction projects or designs and for evaluating the potential downsizing of the HVAC system capacity due to use of PCMs. This software is capable of designing, engineering and estimating PCM applications and optimizes for performance and cost.

The software is an engineering software product that performs analysis and design of PCM applications for both new and retrofit construction.

The software has unique input variables for:
  Latent heat capacity of the bulk PCM formulation used;
  Specific Melt Temperature Range;
  Specific Freeze Temperature Range;

Physical Properties of the top and bottom and sides of the containment system used, including specific heat, specific gravity, heat transfer coefficients, thermal insulating of materials used, heat flux and related variables for conduction and convective heat transfer mechanisms;

Analysis of more than one melt and freeze point within the same formulation;

Evaluation of the effects of self-insulation and sub cooling on the bulk PCM;

Analysis and optimization of the PCM assembly for specific engineering solution and installation of the PCM assembly, including determining performance based upon the specific ΔT (delta T) and time over which the PCM is intended to perform.

The software also has the ability to generate data interface and data transfer files to communicate with the most commonly used Energy Modeling Software products available in the marketplace.

Figure 1A:
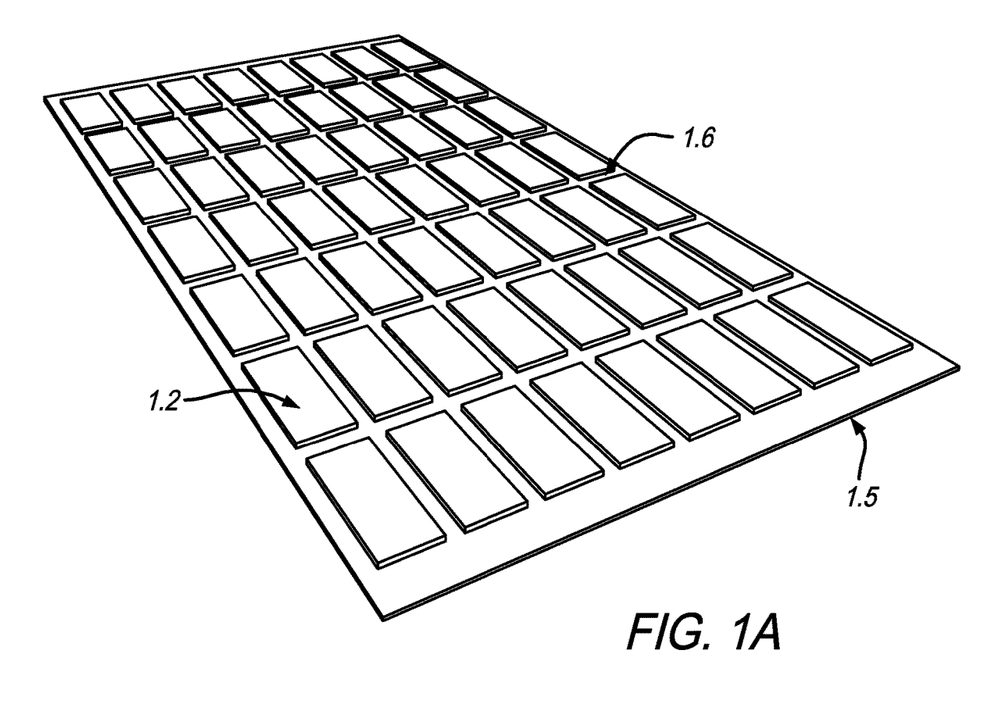
FIG. 1A is a perspective view of a mat containing phase change material constructed in accordance with the principles of the present invention.
Figure 1B:
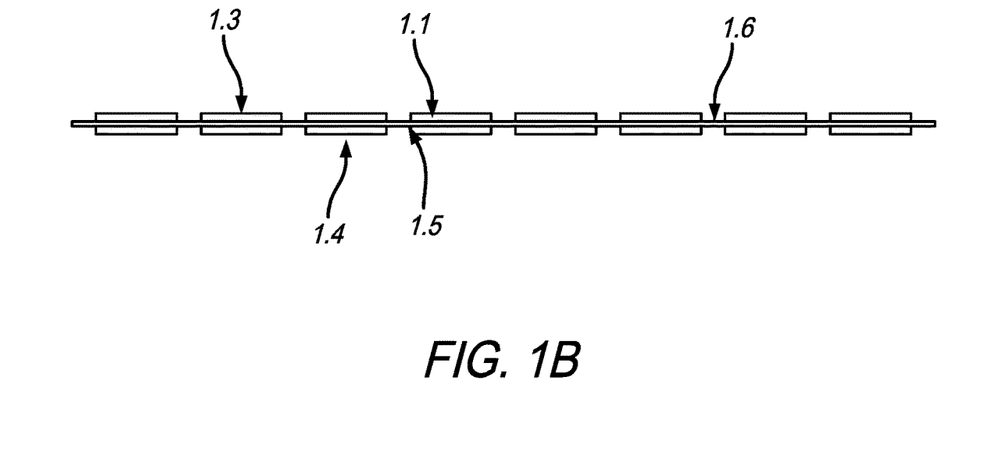
FIG. 1B is a side view of the structure illustrated in FIG. 1A.

FIG. 1A and FIG. 1B illustrate a typical manufactured assembly of PCM in a pouch or sachet based package, where each pouch or sachet is filled with a specific amount of bulk PCM, inserted into the packaging while the PCM is in liquid state. The configuration shown contains 56 individual pouches or sachets, evenly spaced, over a 1 ft×2 ft PCM assembly. The individual pouches or sachets (1.2) are sized to contain specific amounts of bulk pcm (1.1) and will vary dependent upon PCM volume but will maintain maximize surface area of packaging while observing the maximum depths of the pouches or sachets, as too much volume of bulk PCM inhibits the performance of the PCM assembly. Quantity of pouches or sachets will also vary according to quantity of bulk PCM required by design per each square foot of package or PCM assembly. In some cases, the PCM assembly will consist of larger packages, pouches, pans, trays, slabs or other assemblies to contain the bulk PCM in an assembly intended to be installed above the ceiling or ceiling tile and below the floor above or roof framing above. The PCM assembly is installed over ceilings or ceiling tiles and the overall dimensions of the packaging may vary to accommodate different sizes of ceiling tiles. The PCM packaging shown consists of two multi-layered films, the top layer (1.3) and the bottom layer (1.4), which are sealed together (1.5) at predetermined points to create pouches or sachets. Individual pouches or sachets of PCM are separated by joints (1.6) which may be heat seals or heat seals combined with adhesive sealants to create individual pouches. The materials top and bottom layers of films may be the same or may be of different compositions, and are optimized for conductive heat transfer, convective heat transfer, depending upon use and design of the PCM assembly. In some cases reflective and radiant facings may be selected as required by design. In certain applications the multi-layered films used for PCM packaging are designed to be fire resistive and to meet or exceed the ASTM E 84, UL 723 or NFPA 255 fire test procedures.

Figure 2A:
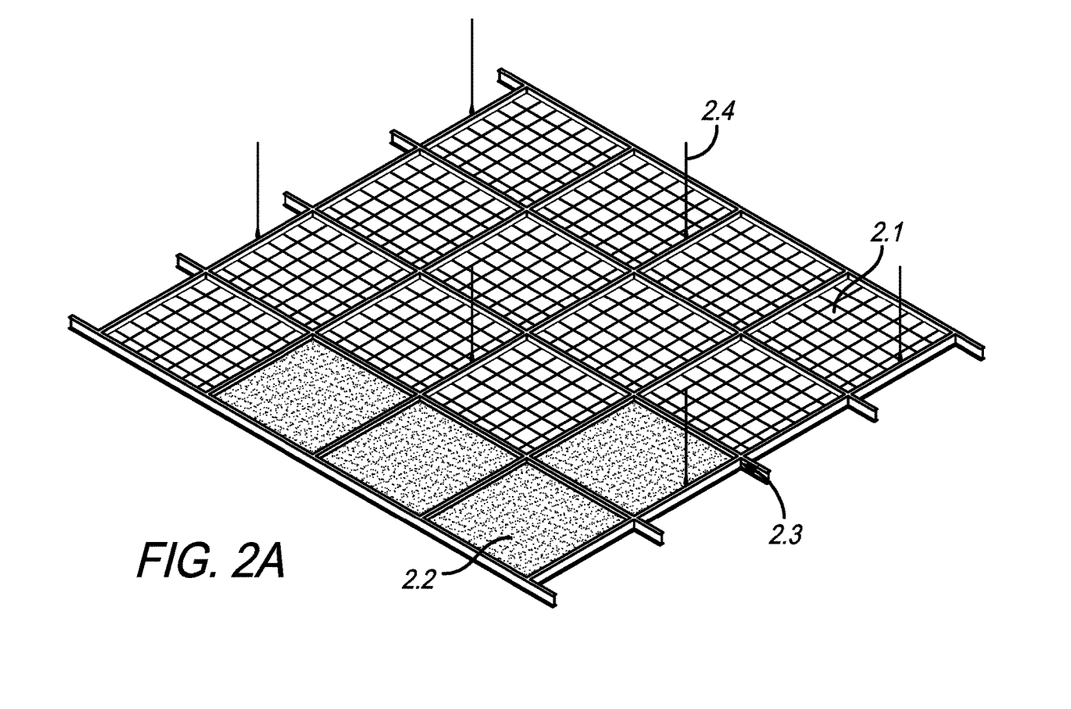
FIG. 2A is a perspective view of a typical assembly of the structures illustrated in FIG. 1A for installation in a plenum area.
Figure 2B:
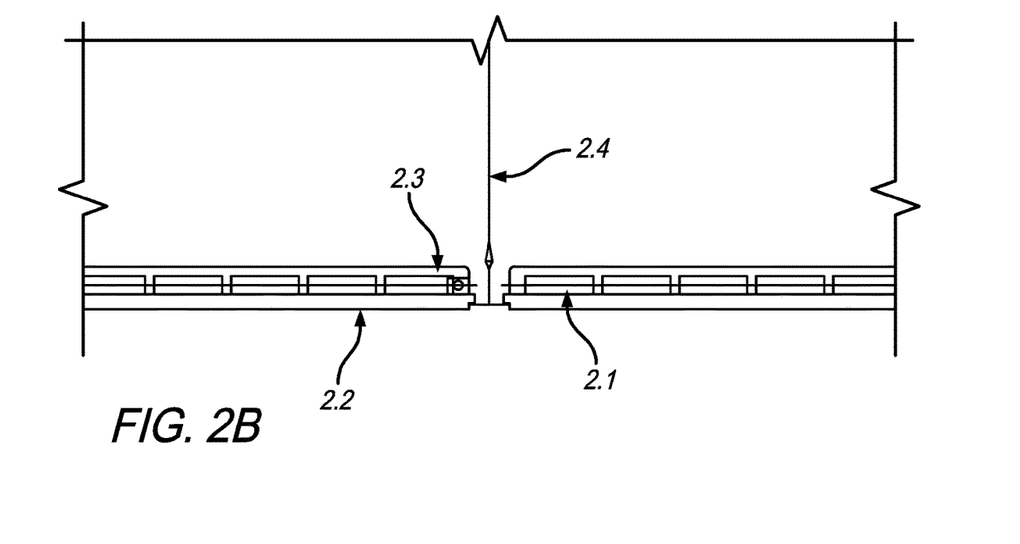
FIG. 2B is a side view of the structure as shown in FIG. 2A.

FIG. 2A and FIG. 2B illustrate a typical PCM assembly installation, where the PCM Assembly (2.1) is placed directly on top of the ceiling or the ceiling tile (2.2), which is itself supported by ceiling tile grid or bar support systems (2.2) and suspended by support wires or other attachments (2.4) which are attached to the upper framing materials above. The individual faces of the PCM packaging material itself may be selected to optimize heat transfer where the face of packaging in contact with the ceiling or ceiling tile is optimized for conductive and the face of exposed packaging above optimized for convective heat transfer. In all cases, one or both faces of the PCM assembly (2.1) may be comprised of special multi-layer facings which are specifically designed and selected based upon their unique heat transfer properties in addition to their ability to meet or exceed fire and smoke test standards, as required by design.

Figure 3A:
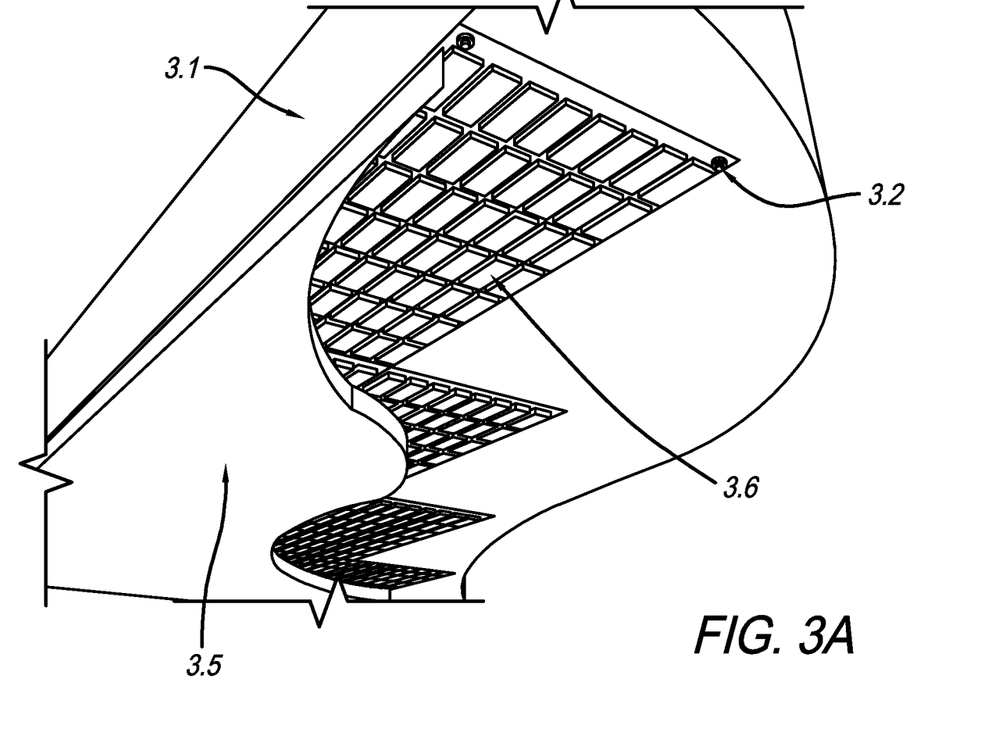
FIG. 3A is a perspective view illustrating an assembly of the type shown in FIG. 1A installed on the underside of a ceiling in a structure.
Figure 3B:
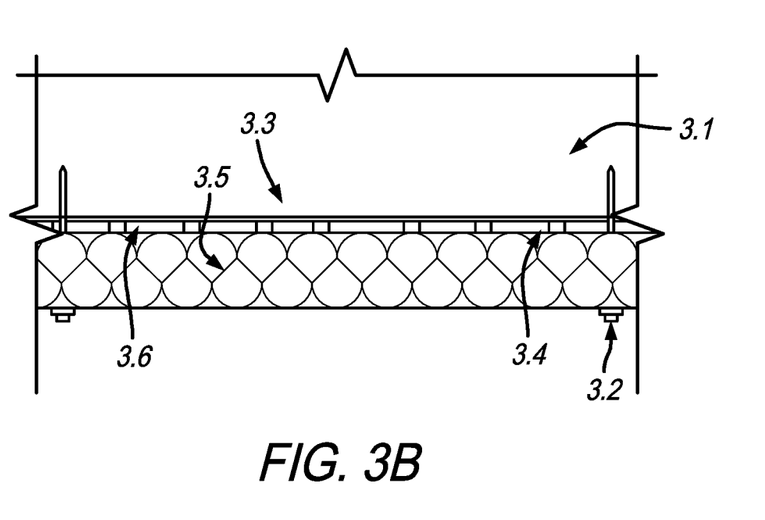
FIG. 3B is a side view of the structure as shown in FIG. 3A.

FIG. 3A and FIG. 3B illustrate a typical PCM assembly installation where the PCM assembly (3.6) is placed directly under and adjacent to the underside of roof or floor framing (3.1) and held in place by fasteners (3.2) attaching the PCM assembly directly to the floor or roof structure or can be held in place by duct pins, wind lock washers, wires, racks, grids or other methods of attachments designed to hold the PCM assembly snug to the underside of roof or floor framing to enhance conductive heat transfer between the underside of roof or floor and the PCM assembly. Roof framing materials may be steel, concrete, wood, masonry or other common construction materials. In some cases the upper face of PCM assembly may be installed using the methods of attachment shown but with an air gap between the upper face of PCM assembly and the underside of floor or roof framing, as required by design, and where the upper surface of PCM packaging (3.3) may be optimized for convective heat transfer (not shown). The bottom side of the PCM assembly packaging (3.4) may also selected to increase the thermal efficiency of the PCM assembly, specifically for convective heat transfer, when the lower face of packaging is exposed (detail not shown). In some cases the bottom of the PCM assembly may be covered by a layer of insulating material (3.5) to retard thermal energy transfer through the bottom face of the PCM assembly packaging, in which instance the packaging materials composition is selected for a low rate of conductive heat transfer through the PCM assembly surface in contact with the insulation.

Figure 4A:
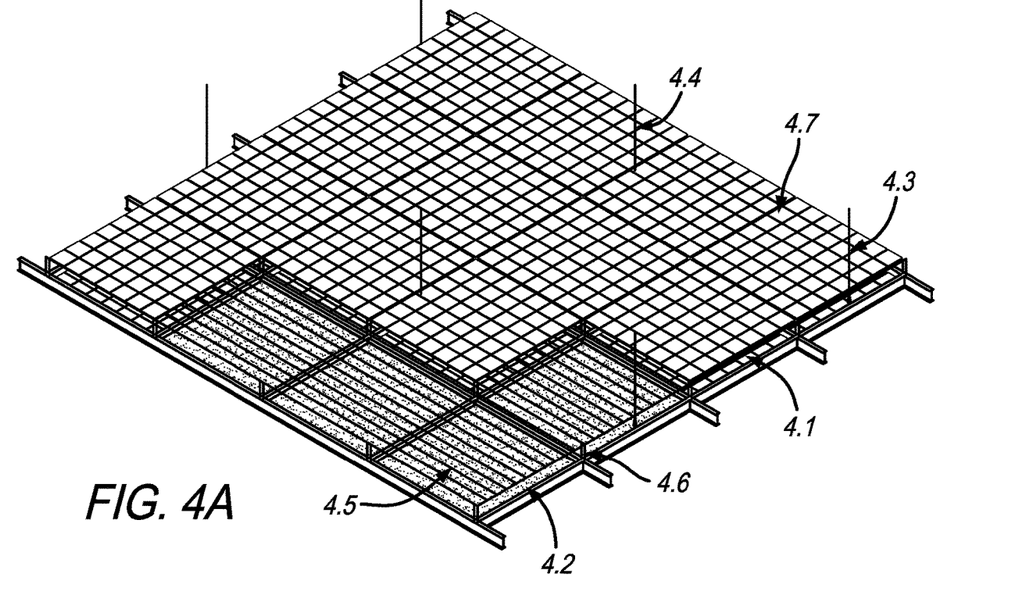
FIG. 4A is a perspective view illustrating an assembly wherein more than one mat is installed in the plenum area of a structure.
Figure 4B:
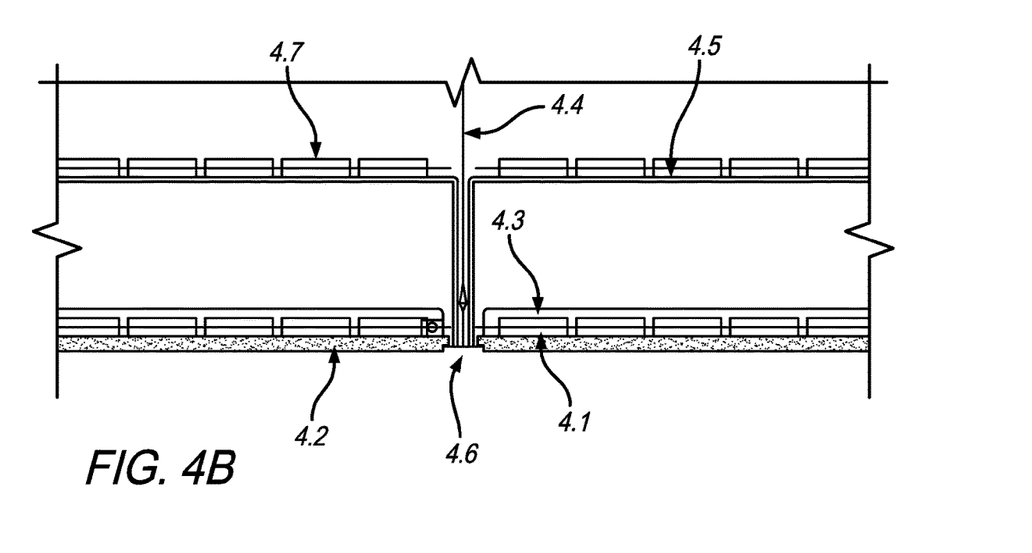
FIG. 4B is a side view of the structure as shown in FIG. 4A.

FIG. 4A and FIG. 4B illustrate a typical PCM assembly installation, where more than one PCM assembly is installed in the building space between top of ceiling and underside of roof or floor framing above. The first PCM assembly (4.1) is placed directly on top of a ceiling or ceiling tile (4.2), which is itself supported by ceiling tile grid or bar support systems (4.3) and suspended by support wires or other attachments (4.4) which are attached to the upper framing materials above. In some cases the first PCM assembly may be installed directly adjacent to the underside of the floor or roof framing above. The second PCM assembly (4.7) is installed on top of or supported by an elevated support system (4.5) that raises the PCM assembly above the upper surface of the ceiling or the ceiling tile (4.2). The elevated support system as shown (4.6) is bearing directly upon the top of the ceiling tile or ceiling, but may also be supported independently from the ceiling or tile by bearing on the ceiling tile support grid work or T-Bar system, or may be suspended from underside of roof or floor framing above using racks, wires, brackets, trays, baskets or other support members to suspend the PCM assembly above the surface of the ceiling tile or ceiling or below the underside of floor or roof framing and expose both surfaces of the PCM assembly to convective heat transfer. The PCM assembly packaging films may be selected to improve convective heat transfer between the PCM assembly and the surrounding air or to optimize thermal energy transfer between adjacent PCM assemblies. The measurement between the PCM assemblies themselves and the measurement between the PCM assemblies and the ceiling or ceiling tile below, or the roof or floor framing above, is determined by engineering for the best placement of PCM assemblies based upon unique building variables for best performance. In some cases the raised PCM assemblies may be installed at different heights or may be installed at the same heights. In some cases the PCM assembly placed adjacent to the top of ceiling or ceiling tile or against the underside of floor or roof framing may be omitted, and only raised or suspended PCM assemblies subject to convective heat transfer on both exposed surfaces are installed. The thermal performance, freeze and melt ranges, and latent heat capacity of the bulk PCM contained in each assembly can be either the same or different, depending upon design and performance requirements.

Figure 5A:
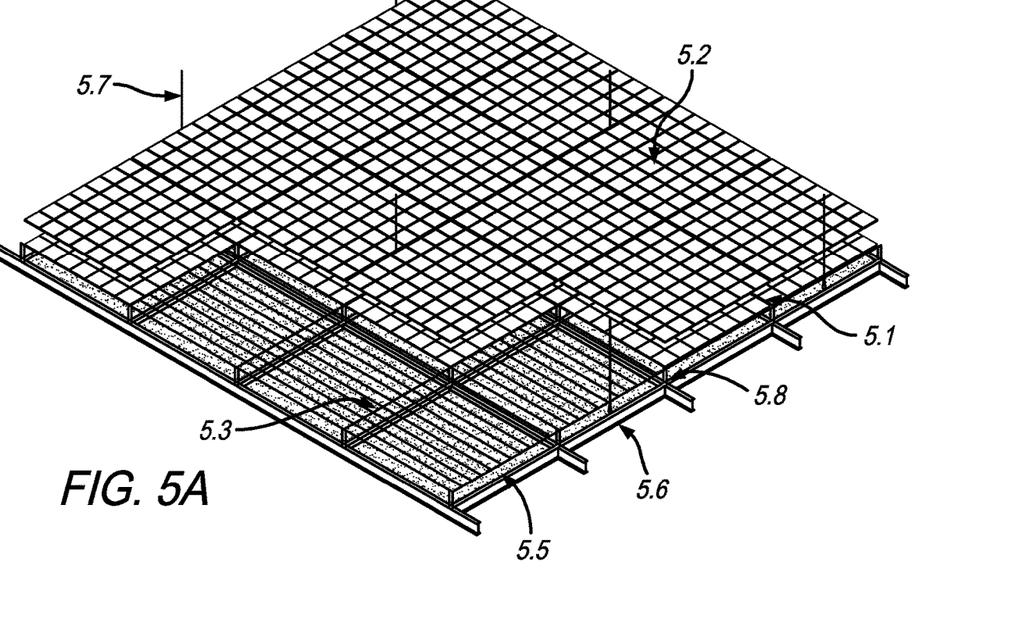
FIG. 5A is a perspective view illustrating an assembly wherein a plurality of mats are disposed within a plenum area above the upper surface of the ceiling.
Figure 5B:
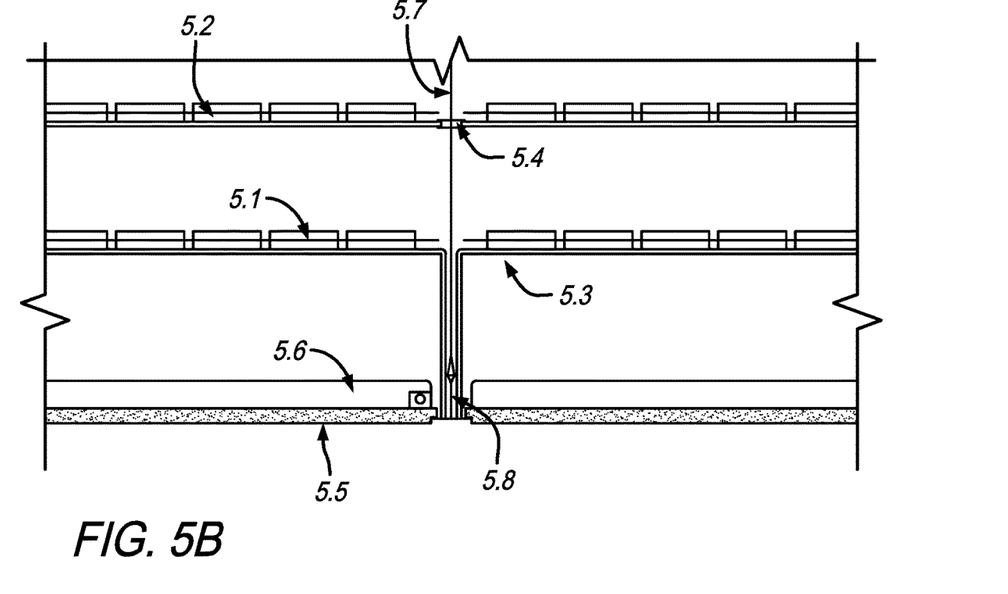
FIG. 5B is a side view of the structure as shown in FIG. 5A.

FIG. 5A and FIG. 5B illustrate a typical multiple package PCM assembly installation, where more than one PCM Assembly (5.1, 5.2) is placed directly on top of an elevated support systems (5.3, 5.4) that raise the PCM assembly above the upper surface of the ceiling or the ceiling tile (5.5), which is itself supported by ceiling tile grid or bar support systems (5.6) and suspended by support wires or other attachments (5.7) which are attached to the upper framing materials above. The elevated support system as shown (5.3) is bearing directly upon the top of the ceiling tile or ceiling (5.8), but may also be supported independently from the tile by bearing on the ceiling tile support grid work or T-Bar system, or may be suspended from above using racks, wires, brackets, trays, or other support members (5.4) to elevate additional PCM assemblies (5.1, 5.2) above the surface of the ceiling tile or ceiling or below roof or floor framing above and expose both surfaces of the PCM assembly to convective heat transfer. In some cases multiple PCM assemblies may be installed to create a multi-layer of PCM assemblies, as required by design. The PCM assembly packaging material may be selected to improve convective heat transfer between the PCM assembly and the surrounding air and between adjacent PCM assemblies. In some cases the PCM packaging may be the same on both exposed faces or may be different within one package assembly and between one or more package assemblies. The measurement between the PCM assembly and the top of ceiling or ceiling tile below or the bottom of roof or floor framing above is determined by engineering for the best placement of PCM assemblies for best performance. In some cases, the elevation of the raised PCM assemblies may vary or may be of the same elevation. In some cases the PCM assembly may also be installed bearing either on top of the ceiling or ceiling tile or attached to the underside of roof or floor framing above (not shown) in addition to the suspended PCM assembly or assemblies. The thermal performance, freeze and melt ranges, and latent heat capacity of the bulk PCM contained in each assembly can be either the same or different, depending upon design and performance requirements.

Figure 6A:
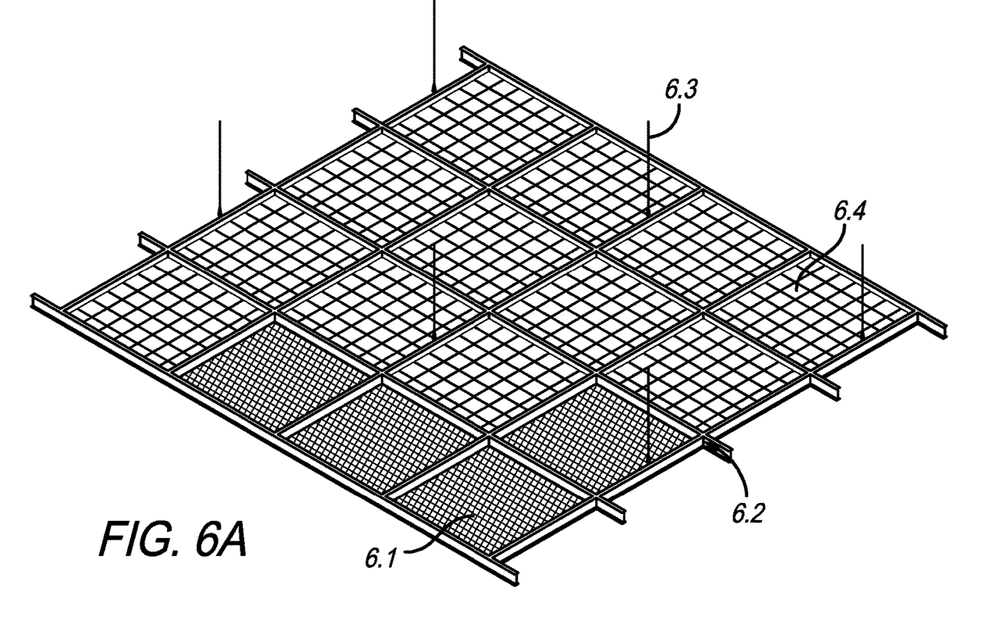
FIG. 6A is a perspective view of an assembly positioned directly on top of a perforated ceiling or ceiling tile materials in lieu of typical ceilings or ceiling tiles.
Figure 6B:
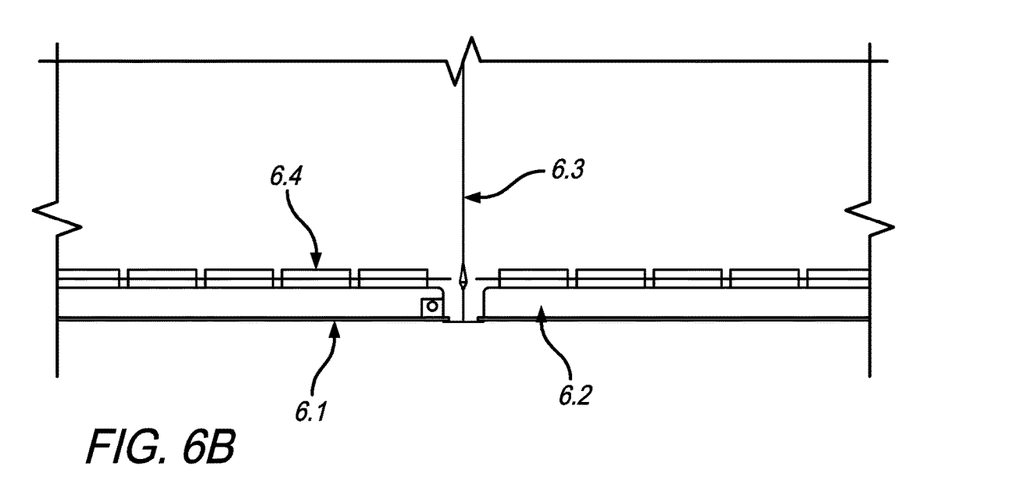
FIG. 6B is a side view of the structure illustrated in FIG. 6A.

FIG. 6A and FIG. 6B illustrate a typical installation of a PCM assembly directly on top of perforated ceiling or ceiling tile materials in lieu of typical ceilings or ceiling tiles. Perforated ceiling materials or ceiling tiles (6.1) may be used in combination with any of the above methods previously described above. Perforation or otherwise removing material from the element separating the PCM assembly and the space below the ceiling or ceiling tile increases the rate and transfer of thermal energy into the PCM assembly (6.4) by reducing thermal resistance and increases the performance of the PCM assembly. Using a perforated material, such as a perforated metal grid or panel, egg crate, lighting grills or other materials which may be metal, plastic, wood or foam, allows for faster melting and freezing rates of the bulk PCM which can increase overall PCM assembly performance. Perforated assemblies are typically installed into standard ceiling tile support systems (6.2) and supported by attachment to framing above (6.3) but in some cases replace the support systems in their entirety or just partially over the occupied space below. More than one PCM assembly can be installed in the space above the perforated ceiling or ceiling tile and below the underside of floor or roof framing by using methods previously described. Bulk PCM formulations and performance and PCM assembly packaging can also be designed and installed as previously described. In all cases, one or both faces of the PCM assembly may be comprised of special multi-layer facings which are specifically designed and selected based upon their unique heat transfer properties in addition to their ability to meet or exceed fire and smoke test standards, as required by design.

Figure 7A:
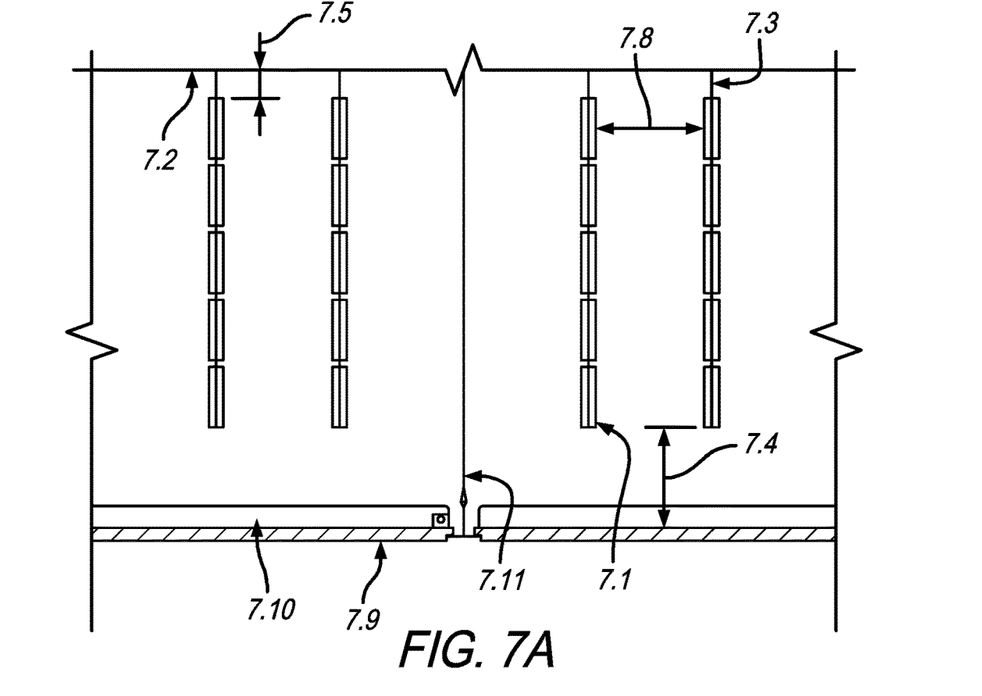
FIG. 7A illustrates a side view of mats containing phase change material as shown in FIG. 1 disposed in a vertical position within a plenum and with the mats equally spaced.
Figure 7B:
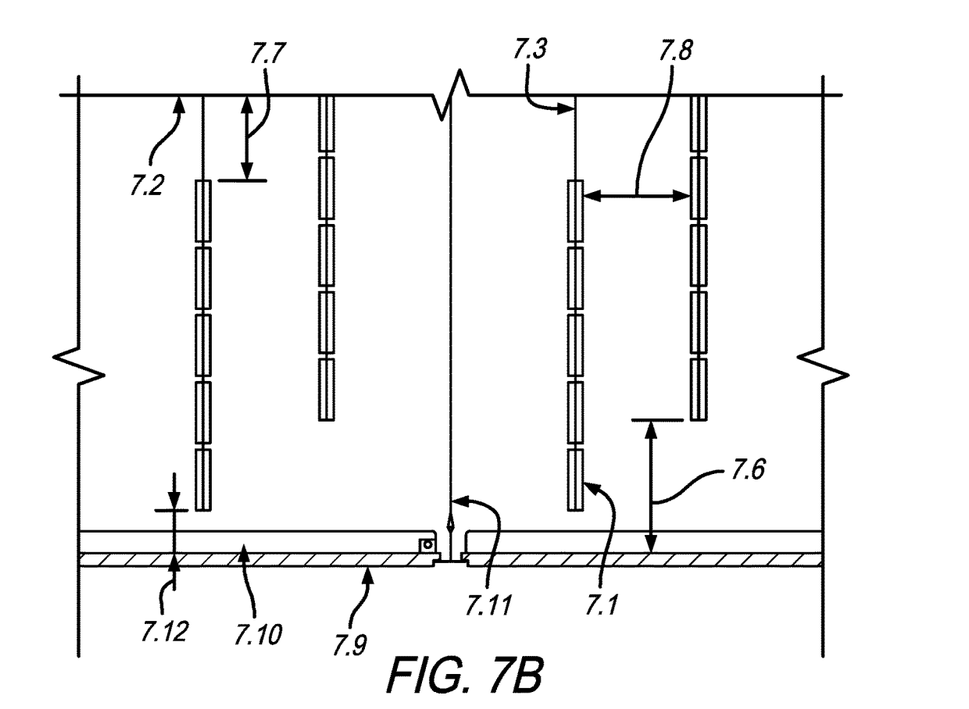
FIG. 7B is similar to FIG. 7A but with the mats positioned at different heights and different spacings.

FIG. 7A and FIG. 7B illustrate a typical installation of one or more PCM assemblies installed in a vertical or upright orientation in the space between the top of ceiling or ceiling tile and below the underside of floor or roof framing. Vertical PCM assemblies (7.1) can be attached to upper framing (7.2) by fasteners, brackets or held in place by grids, cassettes, wires (7.3) or hangars or in some cases be supported by ceiling mounted assemblies that bear on the ceiling and allow the PCM assemblies to hang or drape vertically from or over framing (not shown). The PCM assemblies can be installed at the same height or distance from ceiling below (7.4) or roof above (7.5) or they can be installed at alternating or different heights or distance from ceiling below (7.6, 7.12) and roof above (7.7), depending upon design. The measurement between PCM assemblies (7.8) can also be varied per design requirements. In some cases multiple PCM assemblies may be installed to create a multi-curtain of PCM assemblies. In some cases horizontal PCM assemblies (not shown) may also be installed on top of the ceiling or ceiling tile (7.9), which is supported by ceiling or ceiling tile framing (7.10) and hung from the underside of floor or roof framing above (7.11). The PCM assembly packaging material may be selected to improve convective heat transfer between the PCM assembly and the surrounding air and in some cases the PCM packaging may be the same on exposed both sides or may be different within one package assembly and between one or more package assemblies. The orientation of the PCM assemblies may be altered to increase or decrease the convective heat transfer between the vertical PCM assemblies and the direction of the air flow in the space between the ceiling below and the framing above, whether such orientation is parallel, perpendicular or some angle in between, relative to the direction of the air movement. The thermal performance, freeze and melt ranges, and latent heat capacity of the bulk PCM contained in each assembly can be either the same or different, depending upon design and performance requirements. In all cases, one or both faces of the PCM assembly may be comprised of special multi-layer facings which are specifically designed and selected based upon their unique heat transfer properties in addition to their ability to meet or exceed fire and smoke test standards, as required by design.

Figure 8A:
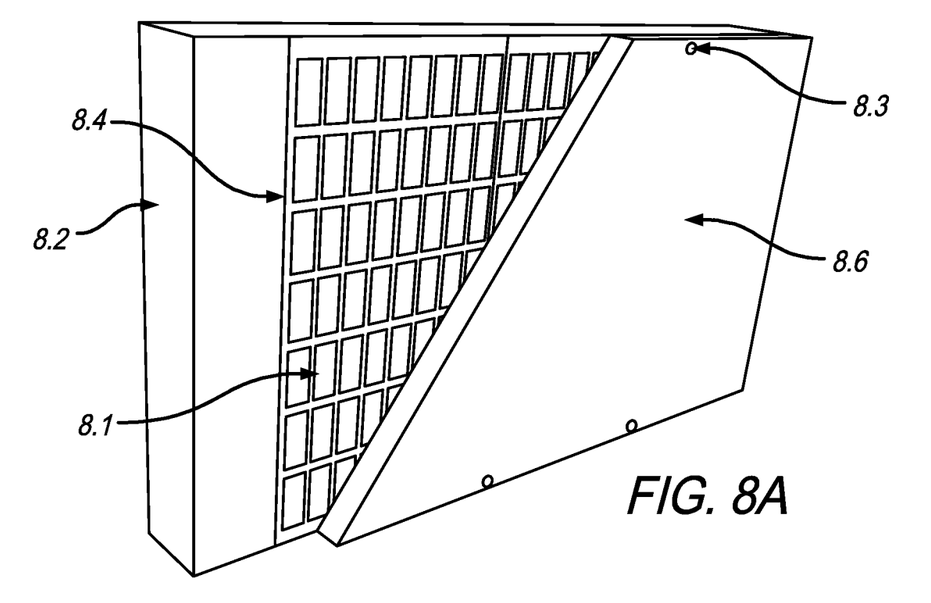
FIG. 8A is a perspective view of an assembly such as that shown in FIG. 1A installed vertically against the wall in the plenum space.
Figure 8B:
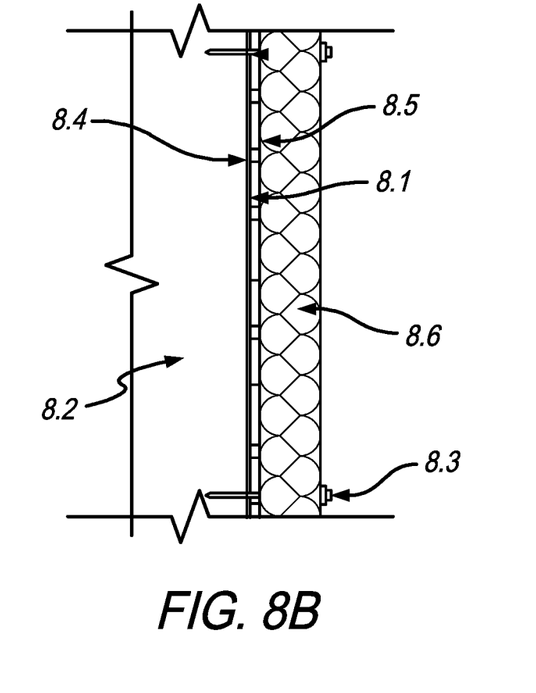
FIG. 8B is a side view of a structure of FIG. 8A, but further including insulation materials.

FIG. 8A and FIG. 8B illustrate a typical installation of a PCM assembly installed vertically against the wall or walls in the attic or plenum space between the top of ceiling or ceiling tile and the underside of floor or roof framing above. The PCM assembly (8.1) is attached on the inside of wall framing (8.2) by fasteners (8.3), brackets, tabs, wires or other installation materials. Where the face of PCM assembly package is in contact with the inside face of wall framing (8.4), the packaging material may be optimized for conductive heat transfer between wall materials and PCM assembly. In some cases there is an air gap between the face of wall framing and the face of PCM packaging (not shown). The outside face of the PCM packaging (8.5) may be installed against insulation materials (8.6) attached to the PCM assembly and in such case the inside face of packaging may be selected for low rates of thermal energy transfer. In some cases there is no insulation (not shown) and then the inside face of PCM package assembly is selected for high convective heat transfer properties. In all cases, one or both faces of the PCM assembly may be comprised of special multi-layer facings which are specifically designed and selected based upon their unique heat transfer properties in addition to their ability to meet or exceed fire and smoke test standards, as required by design.

There has thus been disclosed a system having a phase change material encapsulated between layers of heat transfer material to form mats which can be installed in the plenum areas of rooms within a building to generate energy consumption reduction and cost savings in the HVAC of the building.

What is claimed is:

1. A product of manufacture for energy consumption savings and cost reduction in a structure or a building, the product of manufacture comprising:
   (a) a first Phase Change Material (PCM) assembly, rack, tray or mat comprising a plurality of encapsulated, microencapsulated or packaged PCM, or a plurality of pouches comprising or having contained therein the plurality of encapsulated, microencapsulated or packaged PCM,
   wherein an outer face of the first PCM assembly, rack, tray or mat is open and exposes the plurality of encapsulated, microencapsulated or packaged PCM, or the plurality of pouches to surrounding air to improve convective heat transfer between the plurality of encapsulated, microencapsulated or packaged PCM, or the plurality of pouches, and the surrounding air; and
   (b) at least one additional PCM assembly, rack, tray or mat comprising a plurality of encapsulated, microencapsulated or packaged PCM, or a plurality of pouches comprising or having contained therein the PCM, and the outermost at least one additional PCM assembly, rack, tray or mat has an outer face,
   wherein the plurality of encapsulated, microencapsulated or packaged PCM, or the plurality of pouches, of the at least one additional PCM assembly, rack, tray or mat are exposed to the surrounding air to improve convective heat transfer between the plurality of encapsulated, microencapsulated or packaged PCM, or the plurality of pouches, and the surrounding air;
   wherein the first PCM assembly, rack, tray or mat is configured or adapted to be positioned in an opening in a wall or ceiling or between a plenum space and a room or a building space, or the first PCM assembly, rack, tray or mat is configured or adapted to be positioned to cover an opening between a plenum space or opening and a room or a building space, or the first PCM assembly, rack, tray or mat is configured or adapted to be positioned in a plenum space,
   and the at least one additional PCM assembly, rack, tray or mat is configured to be positioned above or in back of the first PCM assembly, rack, tray or mat, and there is a space between the at least one additional PCM assembly, rack, tray or mat and the first PCM assembly, rack, tray or mat.

2. The product of manufacture of claim 1, wherein the plurality of encapsulated, microencapsulated or packaged PCM, or plurality of pouches comprising the plurality of encapsulated, microencapsulated or packaged PCM, are formed by sealing or containing therein said plurality of encapsulated, microencapsulated or packaged PCM within each capsule, microcapsule, package or pouch.

3. The product of manufacture of claim 2, wherein the capsule, microcapsule, package or pouch material comprises a plastic, a polyvinyl chloride (PVC), a metal or a combination thereof.

4. The product of manufacture of claim 3, wherein the metal comprises aluminum.

5. The product of manufacture of claim 1, wherein: (a) said first PCM assembly, rack, tray or mat has conductive heat transfer capability; or (b) the at least one additional PCM assembly, rack, tray or mat has convective heat transfer capability.

6. The product of manufacture of claim 1, wherein the at least one additional PCM assembly, rack, tray or mat comprises multiple PCM assemblies, racks, trays or mats each positioned above or in back of each other within the plenum space or opening, and there is a space between each of the multiple PCM assemblies, racks, trays or mats.

7. The product of manufacture of claim 1, wherein both the first PCM assembly, rack, tray or mat and the at least one additional PCM assembly, rack, tray or mat have convective heat transfer capability.

8. The product of manufacture of claim 1, further comprising a support structure capable of supporting or positioning the at least one additional PCM assembly, rack, tray or mat in a plenum space, or in a space between a wall or ceiling and a room or a building space.

9. The product of manufacture of claim 1, further comprising a support structure or framing capable of supporting or positioning the first PCM assembly, rack, tray or mat and the at least one additional PCM assembly, rack, tray or mat in a plenum space, or in a space between a wall, subfloor, ceiling or ceiling tile and a room or a building space.

10. The product of manufacture of claim 1, wherein the plurality of encapsulated, microencapsulated or packaged PCM comprises a bio-based or an organic phase PCM.

11. The product of manufacture of claim 1, wherein both the first PCM assembly, rack, tray or mat and the at least one additional PCM assembly, rack, tray or mat are configured in a support structure or frame to be in a horizontal position in a plenum space, or in a space between a wall, subfloor, ceiling or ceiling tile and a room or a building space.

12. The product of manufacture of claim 1, wherein both the first PCM assembly, rack, tray or mat and the at least one additional PCM assembly, rack, tray or mat are configured in a support structure or frame to be in a vertical position in a plenum space, or in a space between a wall, subfloor, ceiling or ceiling tile and a room or a building space.

13. The product of manufacture of claim 1, wherein the plurality of encapsulated, microencapsulated or packaged PCM comprises an inorganic PCM material.

14. The product of manufacture of claim 13, wherein the inorganic PCM material comprises a salt hydrate or an eutectic salt.

15. The product of manufacture of claim 1, wherein the amount of the plurality of encapsulated, microencapsulated or packaged PCM contained within each of the first PCM assembly, rack, tray or mat, and the at least one additional PCM assembly, rack, tray or mat is between about 0.15 lb. and about 1.0 lb. per square foot.

16. The product of manufacture of claim 1, wherein the solid to liquid transition point for the plurality of encapsulated, microencapsulated or packaged PCM is from between about 72° F. to about 76° F. and the liquid to solid transition point for said PCM is from about 71° F. to about 68° F.

* * * * *